(12) United States Patent
Mazumdar et al.

(10) Patent No.: US 8,499,909 B2
(45) Date of Patent: Aug. 6, 2013

(54) PEAK DEMAND REDUCTION IN MINING HAUL TRUCKS UTILIZING AN ON-BOARD ENERGY STORAGE SYSTEM

(75) Inventors: Joy Mazumdar, Norcross, GA (US); Walter Köllner, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 853 days.

(21) Appl. No.: 12/604,580

(22) Filed: Oct. 23, 2009

(65) Prior Publication Data
US 2011/0094808 A1 Apr. 28, 2011

(51) Int. Cl.
*B60L 1/00* (2006.01)
*B61C 3/00* (2006.01)
(52) U.S. Cl.
USPC .................................................. 191/2; 105/49
(58) Field of Classification Search
USPC .................. 104/26.05, 35, 49, 50, 53, 54, 59; 191/2–5
See application file for complete search history.

(56) References Cited

U.S. PATENT DOCUMENTS

| 4,358,719 | A | 11/1982 | Currier et al. |
| 5,124,510 | A * | 6/1992 | Garfinkle ........................ 191/65 |
| 6,742,630 | B2 | 6/2004 | Eilinger |
| 7,430,967 | B2 * | 10/2008 | Kumar ............................ 105/35 |
| 7,459,888 | B2 * | 12/2008 | Schulte et al. ................ 320/166 |
| 7,565,867 | B2 * | 7/2009 | Donnelly et al. ............ 105/62.1 |
| 2005/0005814 | A1 | 1/2005 | Kumar |
| 2006/0061307 | A1* | 3/2006 | Donnelly ...................... 318/108 |

FOREIGN PATENT DOCUMENTS

| JP | 2002305803 A | 10/2002 |
| JP | 2004304989 A | 10/2004 |

OTHER PUBLICATIONS

U.S. Appl. No. 12/466,722, filed May 15, 2009 (unpublished).

* cited by examiner

*Primary Examiner* — R. J. McCarry, Jr.

(57) ABSTRACT

A mining haul truck driven by electrical wheel motors is powered by a trolley power system during an uphill climb. Retard energy captured during braking action on either the uphill climb or downhill descent is stored by an on-board electrical energy storage system. Electrical power is supplied from the on-board electrical energy storage system to reduce the peak power demand on the trolley power system during the uphill climb. One implementation of the on-board electrical energy storage system uses an ultracapacitor system.

25 Claims, 9 Drawing Sheets

PEAK DEMAND REDUCTION IN MINING HAUL TRUCKS UTILIZING AN ON-BOARD ENERGY STORAGE SYSTEM

CROSS-REFERENCE TO RELATED APPLICATION

This application is related to U.S. patent application Ser. No. 12/604,571, entitled System and Method for Reinjection of Retard Energy in a Trolley-Based Electric Mining Haul Truck, which is being filed concurrently herewith and which is herein incorporated by reference in its entirety.

BACKGROUND OF THE INVENTION

The present invention relates generally to power systems for mining haul trucks, and more particularly to peak demand reduction in mining haul trucks utilizing an on-board energy storage system.

Mining haul trucks are typically equipped with electrical drive motors. Under some travel conditions, such as inside a mining pit, around a crusher, and on level surfaces, electrical power is supplied by an electrical generator powered by a diesel engine. Under more demanding conditions, such as travel on an uphill grade, electrical power is supplied by a trolley line. The haul truck draws electrical power from the trolley line via a pantograph.

The electrical power drawn from the trolley line exhibits large dynamic swings. When the haul truck with a heavy load is accelerating on an uphill grade, for example, the peak power demand may exceed twice the average power demand. High peak power demand has a negative impact on both the electrical utility company and the mining operator. The high peak power demand may overload the electrical utility substation supplying electrical power to the trolley line. Voltage sags, or even outages, may result. High peak power demand may also overheat the trolley line cables and the pantograph contacts, leading to increased failure rates.

In addition to improved performance and reliability, there is also an economic incentive for reducing peak power demand. Electrical power utility companies supplying power to the mines typically measure the power demand of a mine based on 15-minute intervals, and billing is adjusted for peak power demand during each 15-minute interval. What are needed are method and apparatus for limiting peak power drawn by haul trucks from an electrical power distribution network. Method and apparatus which reduce wasted energy are particularly advantageous.

BRIEF SUMMARY OF THE INVENTION

An electrical motor on a vehicle operates in at least one propel interval and in at least one retard interval. Electrical power generated by the electrical motor during a retard interval is captured and used to charge an on-board electrical energy storage system. When the electrical motor is operating in a propel interval, electrical power is supplied to the electrical motor from the on-board electrical energy storage system and a trolley power system.

In an embodiment, electrical power from the on-board electrical energy system is used to reduce peak demand from the trolley power system. Electrical power supplied by the trolley power system is monitored. When the electrical power supplied by the trolley power system is less than or equal to a power limit, electrical power is supplied to the electrical motor only from the trolley power system. When the electrical power supplied by the trolley power system exceeds the power limit, electrical power is also supplied from the on-board electrical energy storage system. In an embodiment, the on-board electrical energy storage system comprises at least one ultracapacitor.

These and other advantages of the invention will be apparent to those of ordinary skill in the art by reference to the following detailed description and the accompanying drawings.

DETAILED DESCRIPTION

Figure 1:
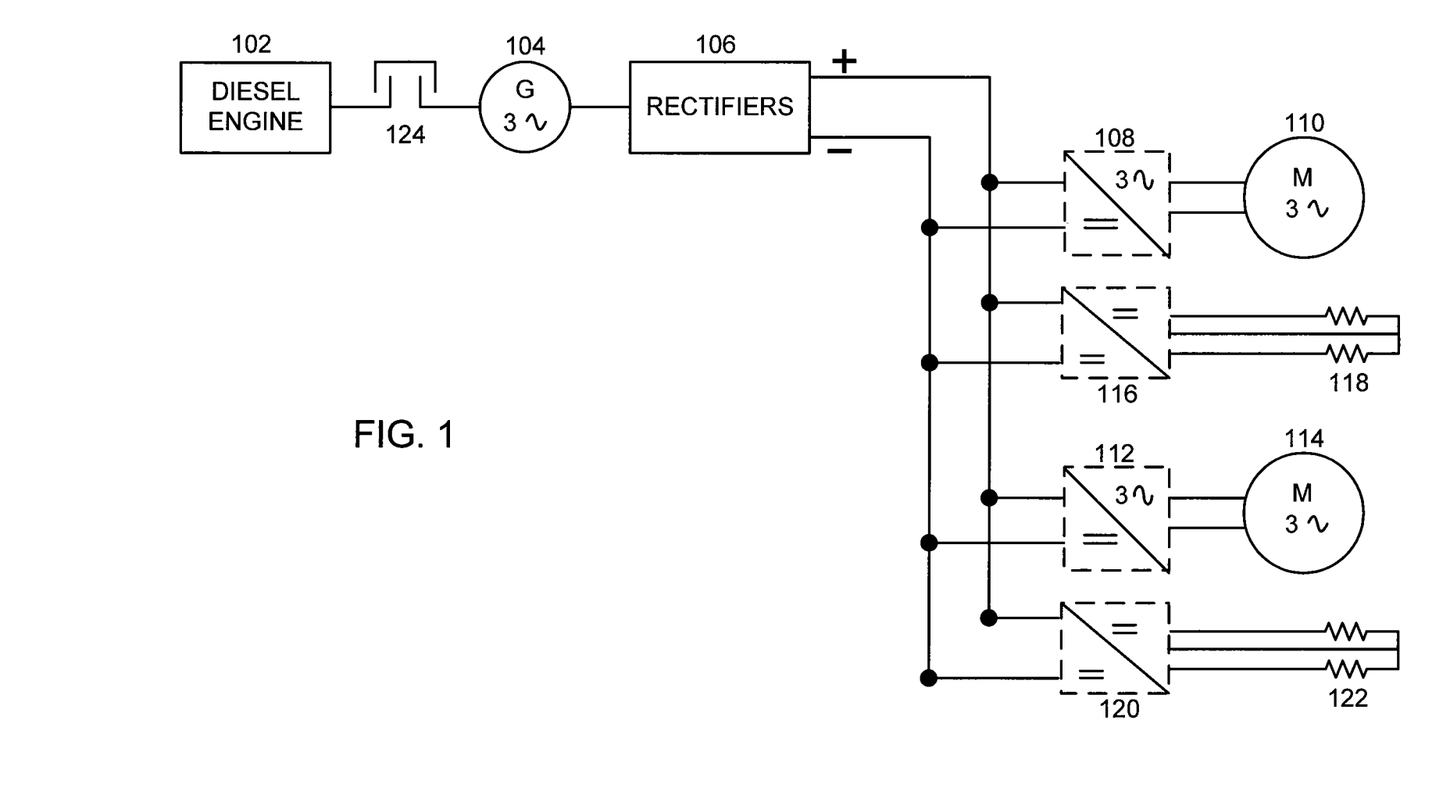
FIG. 1 shows a single-line diagram of a diesel-powered electrical system for a haul truck.

FIG. 1 shows a single-line diagram of a haul truck power system. The haul truck has two drive wheels. Each wheel is driven by a 3-phase alternating-current (AC) wheel motor (M). The wheel motors are referenced as wheel motor 110 and wheel motor 114. Electrical power is supplied by a diesel engine 102 driving a 3-phase AC generator (G) 104. (Other types of mechanical engines may be used; diesel engines are typical in mining operations.) Coupling 124 connects diesel engine 102 to generator 104. Diesel engine 102 and generator 104 are mounted on the haul truck. The AC output of generator 104 is fed into rectifiers 106. The direct current (DC) output of rectifiers 106 is fed into a set of inverters. Inverters 108 supply 3-phase AC power to wheel motor 110. Similarly, inverters 112 supply 3-phase AC power to wheel motor 114. Chopper 116 and power resistor grid 118 dissipate energy from wheel motor 110 during braking action. Similarly, chopper 120 and power resistor grid 122 dissipate energy from wheel motor 114 during braking action. Braking action is described in more detail below.

In the power system shown in FIG. 1, the entire power requirements for wheel motor 110 and wheel motor 114 are supplied by diesel engine 102. Performance (as determined, for example, by acceleration and speed) of the haul truck is limited by the power capacity of the diesel engine. In particular, when the haul truck, filled with a heavy payload, is travelling along an uphill grade, the diesel engine may be stressed to maximum capacity. One method for reducing the power demand on the diesel engine as the haul truck travels on an uphill grade is to power the wheel motors entirely via electrical power drawn from a trolley line. During this operational mode, the generator 104 is disconnected from diesel engine 102 via coupling 124. The diesel engine then idles on uphill grades. As a result, fuel consumption is reduced by ~95%; noise and exhaust emissions are reduced; and productivity and engine life are increased.

Figure 2:
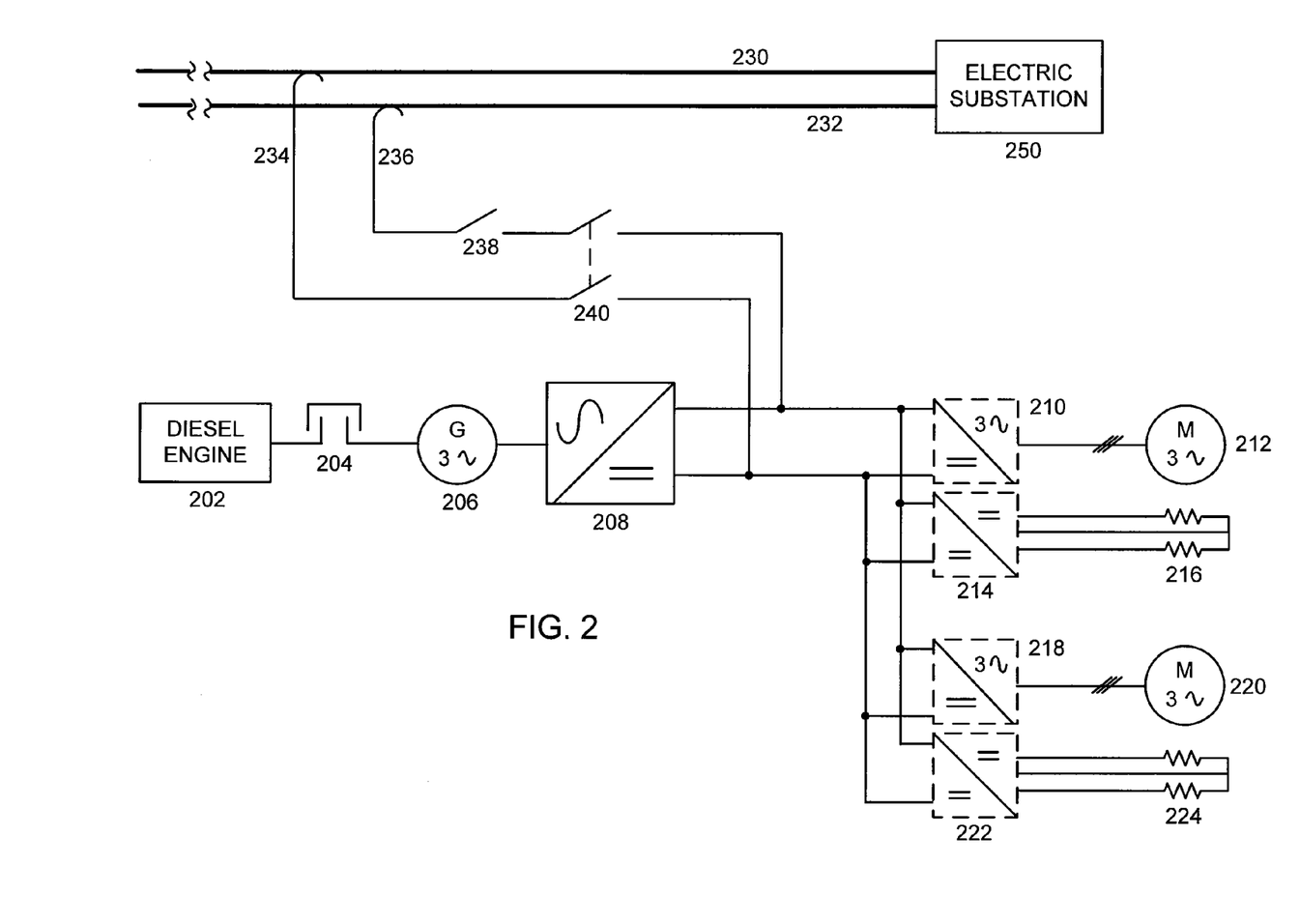
FIG. 2 shows a single-line diagram of a trolley power system for a haul truck.

FIG. 2 shows a single-line diagram of a haul truck power system including an overhead trolley power system. Similar to the power system shown in FIG. 1, diesel engine 202 is connected via coupling 204 to 3-phase AC generator 206. The AC output of generator 206 is fed into rectifiers 208. The DC output of rectifiers 208 is fed into inverters 210, which provide power to wheel motor 212, and into inverters 218, which provide power to wheel motor 220.

The inputs of inverters 210 and inverters 218 may also be connected to DC power supplied by electric substation 250 via trolley line 230 and trolley line 232. Herein, a trolley line is also referred to as an overhead line. Electrical connection of the haul truck to trolley line 230 and trolley line 232 is implemented via pantograph arm 234 and pantograph arm 236, respectively. Throw switch 240 connects/disconnects the inputs of inverters 210 and inverters 218 to trolley line 230 and trolley line 232. There is also an auxiliary breaker 238. When the haul truck is connected to trolley line 230 and trolley line 232 on an uphill grade, a large power demand is placed on the electric substation 250, resulting in a drop in DC link voltage and increased current flow through trolley line 230 and trolley line 232. As mentioned above, when the haul truck is powered by the trolley power system, diesel engine 202 is typically disconnected from generator 206 via coupling 204.

Figure 3:
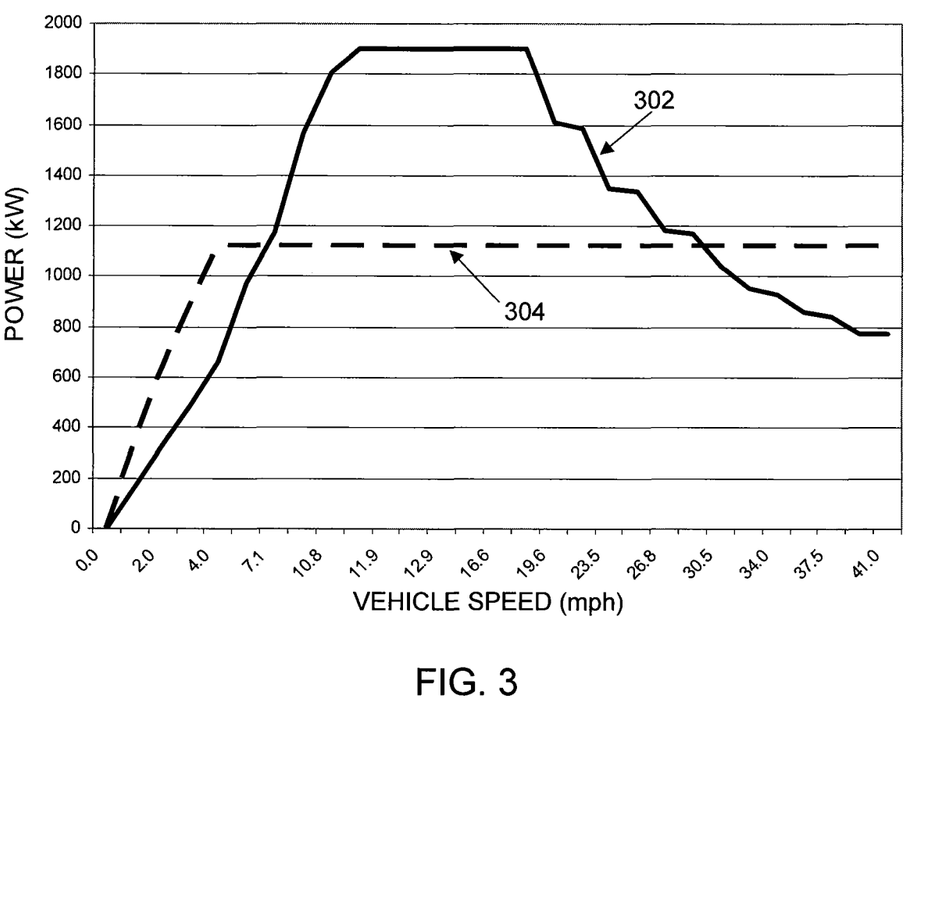
FIG. 3 shows plots of power requirement (for one wheel motor) as a function of vehicle speed.

FIG. 3 shows plots of power requirement (for one wheel motor) as a function of vehicle speed. Since there are two wheel motors, the power requirement for the haul truck is twice the values shown in the plots. Plot 304 shows the power requirement when the haul truck is powered by the diesel engine alone. Plot 302 shows the power requirement when the haul truck is powered by the trolley power system. In plot 304, the motors are not operating at full capacity, since operation is limited by the output power of diesel engine 202 (FIG. 2). In plot 302, the motors are operating at full capacity with power from the trolley power system.

The power requirement of the wheel motor is governed by the designed speed torque characteristic of the wheel motor. In plot 302, the peak power point is achieved for a vehicle speed of approximately 11 mph to 16 mph. Beyond this point, the available torque decreases rapidly, resulting in higher vehicle speeds, but lower hauling capability. For a haul truck, the speed on a gradient is directly proportional to the available power, but inversely proportional to the gross vehicle weight and the gradient. Consequently, the haul truck speed increases because the trolley line can supply more power than the diesel engine, given that in both the scenarios, the gross vehicle weight and the gradient are the same. As an additional benefit, since the available power from the trolley is more, the haul truck can scale steeper gradients at higher speeds for the same gross vehicle weight. The gross vehicle weight is the summation of the empty vehicle weight and the payload. The expression below shows the relationship between the velocity, power, gross vehicle weight, and gradient:

$$\text{velocity} = \frac{\text{Power}}{\text{Gross vehicle weight} * 9.8 * \text{gradient}}.$$

Figure 4:
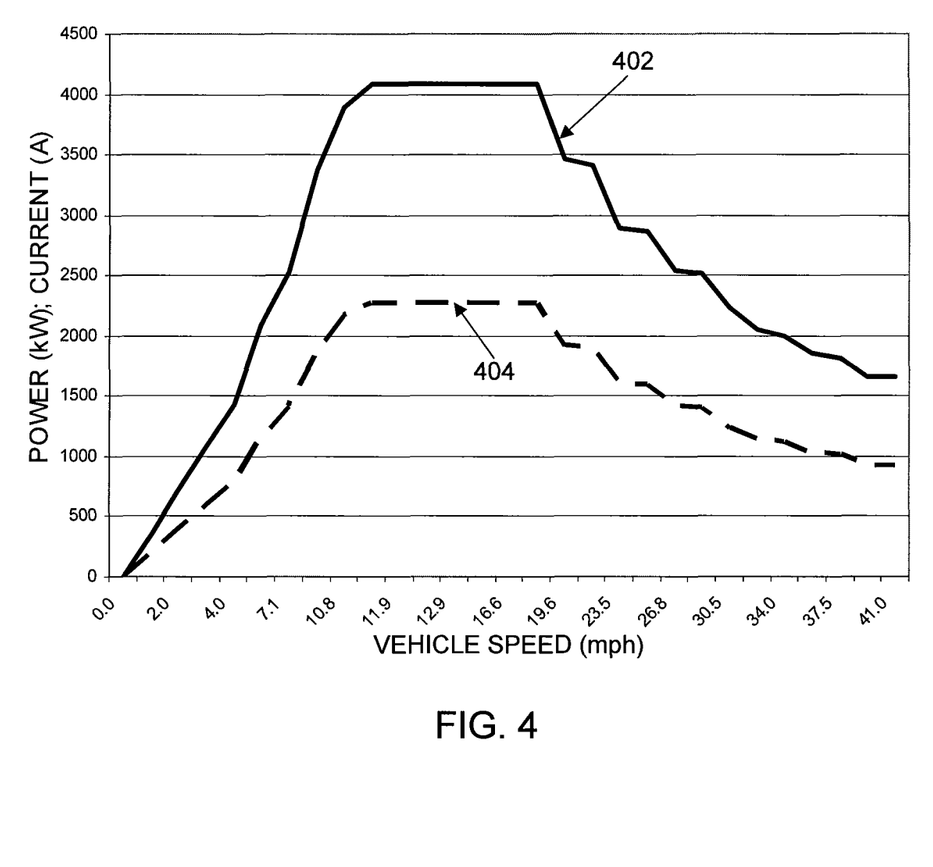
FIG. 4 shows plots of total power and total current drawn as a function of vehicle speed.

FIG. 4 shows plots of the total (both wheels) trolley power and current drawn from trolley line 230 and trolley line 232 as a function of speed of the haul truck. Plot 402 is a plot of the total trolley power in kilowatts (kW); plot 404 is a plot of the total trolley current in amperes (A).

In an embodiment, to slow down a moving haul truck, the haul truck drive system operates in a retard mode. Under normal operation, an electrical motor converts electrical energy into mechanical energy. An electrical motor may also be operated in reverse as a generator to convert mechanical energy into electrical energy, which is fed into inverters. Braking choppers, connected to the inverters, channel the power into a power resistor grid that continuously dissipates the energy until the truck reaches standstill. Braking is smooth, similar to the braking operation in a car, but without mechanical brake wear. Referring to FIG. 2, chopper 214 and power resistor grid 216 provide the braking action for wheel motor 212. Similarly, chopper 222 and power resistor grid 224 provide the braking action for wheel motor 220.

Figure 5:
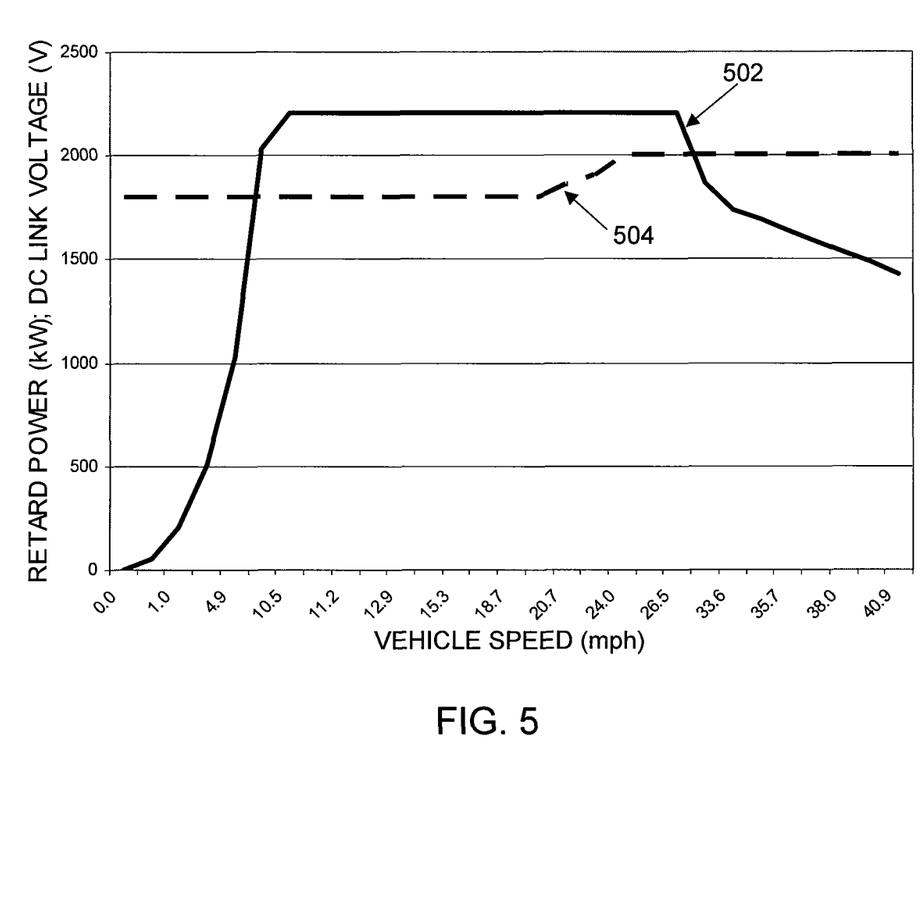
FIG. 5 shows plots of retard power and DC link voltage as a function of vehicle speed.

FIG. 5 shows plots of the retard power for a single wheel motor and the DC link voltage as a function of the speed of the haul truck. Plot 502 shows a plot of the retard power in kW. Plot 504 shows a plot of the DC link voltage in volts (V). When the haul truck brakes, initially the DC link voltage has a tendency to go up. The braking resistors are activated, and the retard energy is then dissipated.

In an embodiment, an energy storage system is integrated into the haul truck power system to recover and store the retard energy. In particular, when a haul truck is travelling downhill on diesel power alone, substantial quantities of retard energy may be captured and stored, since the haul truck is frequently braking, and therefore there are frequent intervals during which the wheel motors are operating in the retard mode. Depending on the terrain, retard energy may also be captured during the uphill trip. The stored energy is then used to supplement the trolley power during peak demand on an uphill haul. In an embodiment, the energy storage system is implemented with an ultracapacitor system comprising an ultracapacitor bank. The amount of energy that can be stored in the ultracapacitor system depends on the size of the ultracapacitor bank. The on-board energy storage system can also be implemented with a rechargeable battery system comprising a battery bank. The amount of energy that can be stored in the battery system depends on the size of the battery bank. Depending on the power demand of the electrical motors and the capacity of the on-board energy storage system, there may be intervals during which the electrical motors may operate on power from only the on-board energy storage system.

An ultracapacitor may provide high power densities. For increased electrical energy storage, multiple ultracapacitors may be connected in series and parallel to form an ultracapacitor bank. Electrical current flowing into an ultracapacitor charges the ultracapacitor, and electrical energy is stored via charge separation at an electrode-electrolyte interface. The stored electrical energy may then later be used to output an electrical current. To maximize the lifetime of an ultracapacitor, the ultracapacitor is not fully discharged. Typically, the ultracapacitor is discharged until its voltage drops to a minimum user-defined lower voltage limit. The lower voltage limit, for example, may be one-half of the initial fully-charged voltage.

Figure 6:
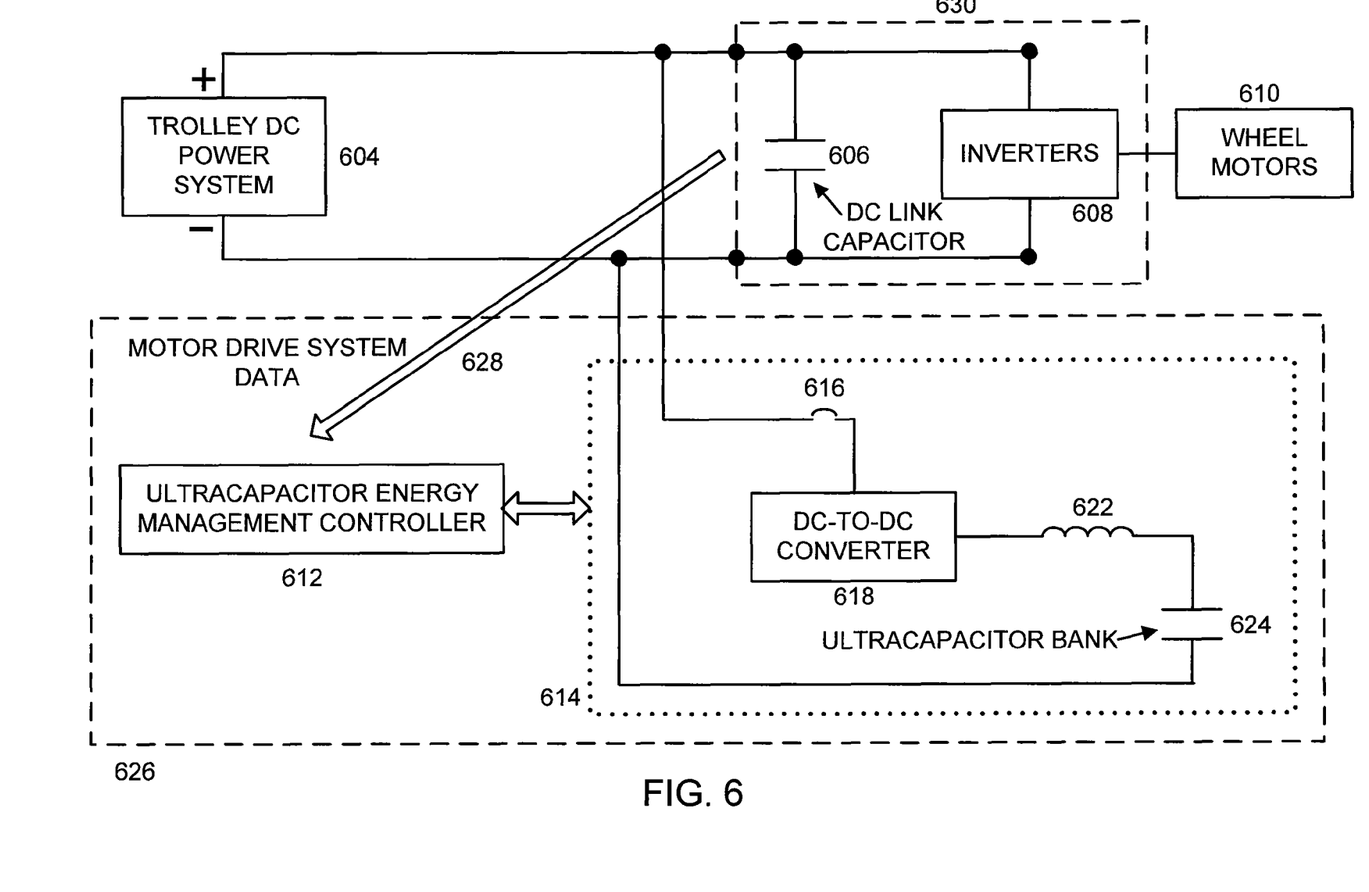
FIG. 6 shows a schematic of a power system with an ultracapacitor energy storage system.

FIG. 6 shows a schematic of an electrical energy storage system 526 integrated into a trolley power system. Wheel motors 610 are powered by motor drive system 630, which includes DC link capacitor 606 and inverters 608. Trolley DC power system 604 provides DC power to motor drive system 630 via trolley lines. In the example shown, electrical energy storage system 626 includes ultracapacitor electrical energy storage unit 614 and ultracapacitor energy management controller 612. In an embodiment, electrical energy storage system 626 is an on-board electrical energy storage system. An on-board energy storage system refers to an energy storage system which travels with the haul truck (for example, mounted on the haul truck or attached to the haul truck or mounted on a trailer attached to the haul truck). The ultracapacitor electrical energy storage unit 614 comprises DC-to-DC converter 618, choke/reactor 622, and ultracapacitor bank 624. The ultracapacitor electrical energy storage unit 614 may be disconnected from the motor drive system 630 via connect/disconnect switch 616. The ultracapacitor electrical energy storage unit 614 is managed by ultracapacitor energy management controller 612. Ultracapacitor energy management controller 612 may also receive motor drive system data 628, which characterizes operation of the motor drive system 630. Motor drive system data 628 includes, for example, DC link voltage, current, and temperature.

In one example, a typical DC link voltage (voltage across DC link capacitor 606) is 1800 V. One string of 14 ultracapacitors in series can supply a continuous current of 150 A, operating at 1750 V, corresponding to an available energy of 1354 watt-hrs. When the haul truck engages the trolley power system in the propel mode, the ultracapacitor bank 624 discharges to DC link capacitor 606 via choke/reactor 622, DC-to-DC converter 618, and connect/disconnect switch 516. Ultracapacitor bank 624 supplies energy to the haul truck until the ultracapacitor bank voltage (voltage across the ultracapacitor bank 624) drops to a user-defined lower limit (for example, half its initially charged voltage). At this point, the ultracapacitor bank 624 is disconnected from the DC link capacitor 606 via connect/disconnect switch 616, and normal operation continues on the trolley. During the retard mode, the ultracapacitor bank 624 charges via connect/disconnect switch 516, DC-to-DC converter 618, and choke/reactor 622.

Note that ultracapacitor bank 624 may also be charged from other electrical power sources (also referred to as auxiliary power supplies). For example, ultracapacitor bank 624 may be charged by diesel engine 202 and generator 206 (see FIG. 2) when diesel engine 202 is idling. As another example, ultracapacitor bank 624 may be charged with electrical power supplied by trolley DC power system 604.

Figure 7:
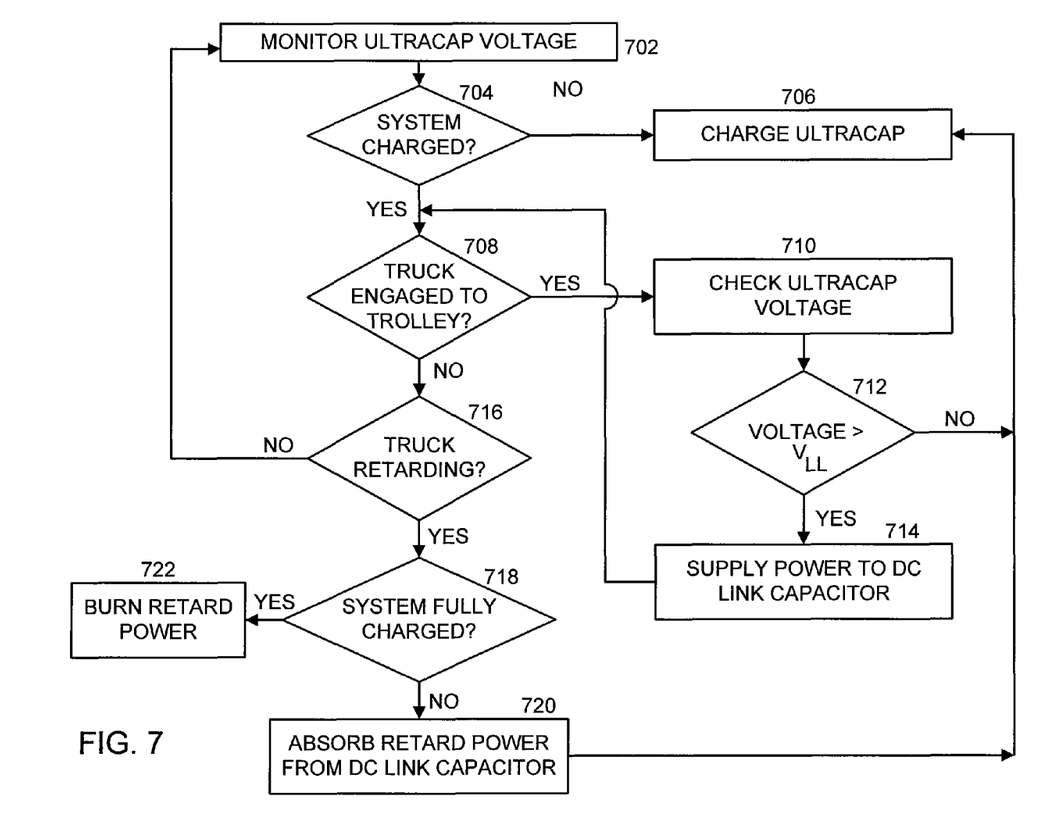
FIG. 7 shows a flowchart of steps for reducing peak power demand from a trolley power system.

FIG. 7 shows a flowchart of steps for reducing peak power drawn from the trolley power system. In one embodiment of the invention, the steps are performed by ultracapacitor energy management controller 612 (see FIG. 6). In step 702, the voltage of ultracapacitor bank 624 is monitored. The process then passes to step 704, in which the charge state of ultracapacitor bank 624 is determined. In an embodiment, ultracapacitor bank 624 is considered to be charged if the ultracapacitor bank voltage is greater than a user-specified value $V_0$ (within a user-specified tolerance). If the ultracapacitor bank 624 is not charged, then the process passes to step 706, in which ultracapacitor bank 624 is charged. As discussed above, ultracapacitor bank 624 may be charged via several user-specified power sources.

If the ultracapacitor bank 624 is charged, then the process passes to step 708, in which engagement of the haul truck to the trolley power system is determined. If the haul truck is engaged, then the process passes to step 710, in which the ultracapacitor bank voltage is checked. The process then passes to step 712, in which the ultracapacitor bank voltage is compared to a user-specified lower-limit voltage $V_{LL}$. As discussed above, some system designs set $V_{LL}=V_0/2$. If the ultracapacitor bank voltage is greater than $V_{LL}$, then the process passes to step 714, in which power is supplied by the ultracapacitor bank 624 to the DC link capacitor 606. The process then returns to step 708. The ultracapacitor bank 624 continues to supply power to the DC link capacitor 606 as long as the haul truck is engaged to the trolley power system, and the ultracapacitor bank voltage is greater than $V_{LL}$. Referring back to step 712, if the ultracapacitor bank voltage is not greater than $V_{LL}$, then the process returns to step 706, in which ultracapacitor bank 624 is charged.

Referring back to step 708, if the truck is not engaged to the trolley power system, then the process passes to step 716, in which the retard state of the haul truck is determined. If the haul truck is in the retard state, then the process passes to step 718, in which the charge state of the ultracapacitor bank is checked. If the ultracapacitor bank is not fully charged, then the process passes to step 720. The fully charged state may be specified, for example, by a maximum voltage limit across the ultracapacitor bank 624. In step 720 the retard power is absorbed from the DC link capacitor, and the process then returns to step 706, in which the retard power is used to charge the ultracapacitor bank 624. In step 718, if the ultracapacitor bank 624 is fully charged, then the process passes to step 722, in which the excess retard power is burned via choppers and power resistor grids. Referring back to step 716, if the haul truck is not in the retard state, then the process returns to step 702, and the voltage of the ultracapacitor bank 624 continues to be monitored.

In step 722, the excess retard power is burned away. A method and system for returning the excess retard power to a utility grid or an auxiliary energy storage system is described in co-pending U.S. patent application Ser. No. 12/604,571.

Figure 8:
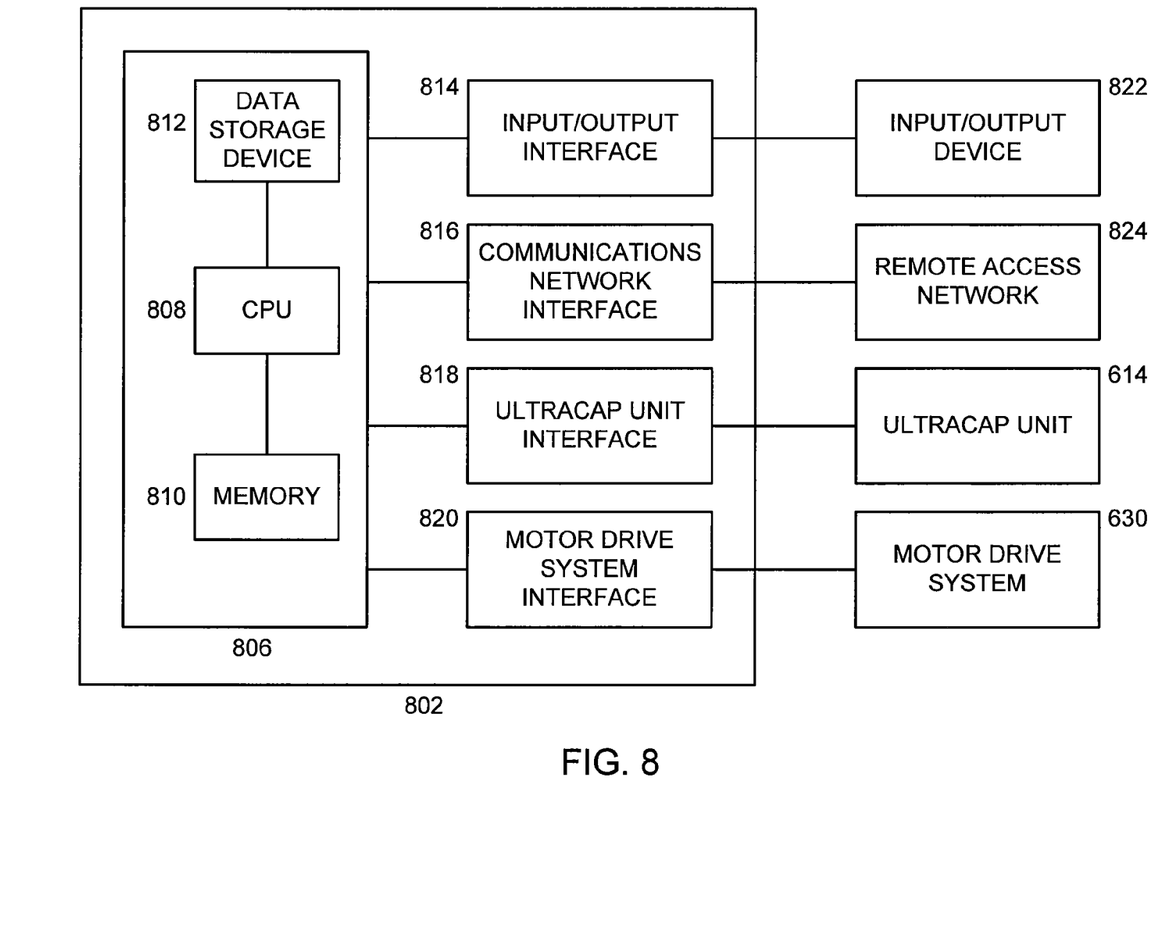
FIG. 8 is a schematic of an ultracapacitor energy management controller.

An embodiment of a computational system for implementing the ultracapacitor energy management controller 612 (FIG. 6) is shown in FIG. 8. The computational system 802 is typically located in the haul truck; however, other locations are possible. One skilled in the art may construct the computational system 802 from various combinations of hardware, firmware, and software. One skilled in the art may construct the computational system 802 from various electronic components, including one or more general purpose microprocessors, one or more digital signal processors, one or more application-specific integrated circuits (ASICs), and one or more field-programmable gate arrays (FPGAs).

Computational system 802 comprises computer 806, which includes a central processing unit (CPU) 808, memory 810, and data storage device 812. Data storage device 812 comprises at least one persistent, tangible computer readable medium, such as non-volatile semiconductor memory, a magnetic hard drive, and a compact disc read only memory. In an embodiment of the invention, computer 806 is implemented as an integrated device.

Computational system 802 may further comprise user input/output interface 814, which interfaces computer 806 to user input/output device 822. Examples of input/output device 822 include a keyboard, a mouse, and a local access terminal. Data, including computer executable code, may be transferred to and from computer 806 via input/output interface 814.

Computational system 802 may further comprise communications network interface 816, which interfaces computer 806 with remote access network 824. Examples of remote access network 824 include a local area network and a wide area network (communications links may be wireless). A user may access computer 806 via a remote access terminal (not shown). Data, including computer executable code, may be transferred to and from computer 806 via communications network interface 816.

Computational system 802 may further comprise ultracapacitor electrical energy storage unit interface 818, which interfaces computer 806 with ultracapacitor electrical energy storage unit 614 (see FIG. 6). Computational system 802 may further comprise motor drive system interface 820, which interfaces computer 806 with motor drive system 630. Motor drive system interface 820, for example, receives motor drive system data 628.

As is well known, a computer operates under control of computer software, which defines the overall operation of the computer and applications. CPU 808 controls the overall operation of the computer and applications by executing computer program instructions which define the overall operation and applications. The computer program instructions may be stored in data storage device 812 and loaded into memory 810 when execution of the program instructions is desired. The method steps shown in the flowchart in FIG. 7 may be defined by computer program instructions stored in the memory 810 or in the data storage device 812 (or in a combination of memory 810 and data storage device 812) and controlled by the CPU 808 executing the computer program instructions. For example, the computer program instructions may be implemented as computer executable code programmed by one skilled in the art to perform algorithms implementing the method steps shown in the flowchart in FIG. 7. Accordingly, by executing the computer program instructions, the CPU 808 executes algorithms implementing the method steps shown in the flowchart in FIG. 7.

Figure 9A:
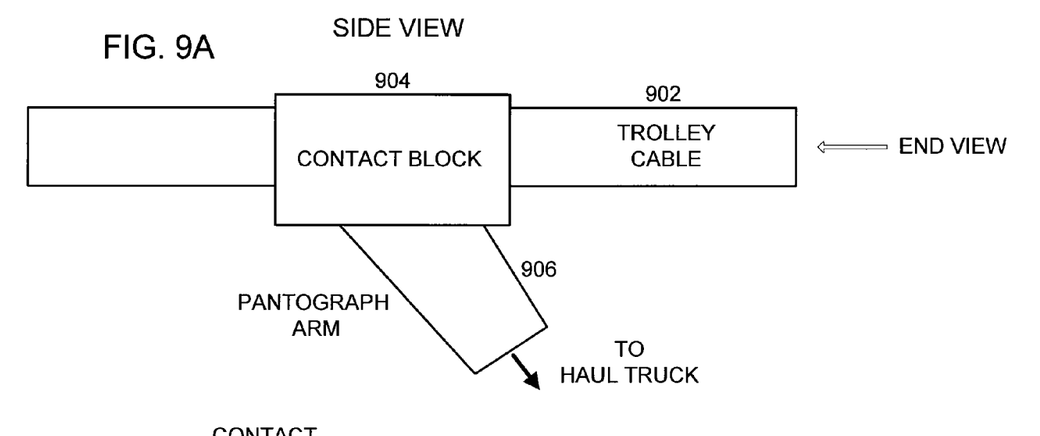
FIG. 9 is a schematic of a trolley cable connection.
Figure 9B:
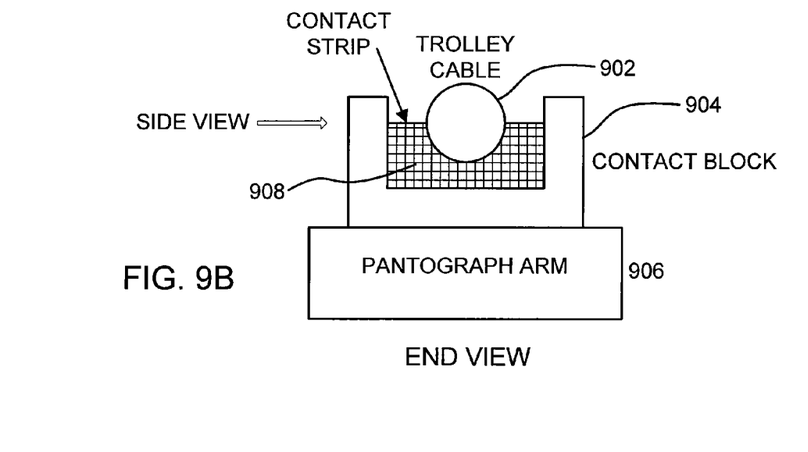

In addition to reducing peak power demand from the trolley power system and increasing overall efficiency by recycling retard energy, the ultracapacitor system also reduces wear on the trolley cable and contact, thereby increasing the reliability and service life of the trolley power system. As previously shown in the electrical schematic of FIG. 2, a haul truck draws power from the trolley power system by connecting to trolley line 230 and trolley line 232 via pantograph arm 234 and pantograph arm 236, respectively. FIG. 9A (side view) and FIG. 9B (end view) show mechanical schematics of the physical coupling between a pantograph arm and a trolley cable. Refer to FIG. 9A. Trolley cable 902 is a bare metal cable, typically fabricated from a high-conductivity copper alloy. A contact block 904 supported by pantograph arm 906 slides along trolley cable 902 as the haul truck travels. Electrical power is transmitted from trolley cable 902 to the haul truck via contact block 904 and a feeder cable (not shown) running down the pantograph arm 906. Refer to FIG. 9B. The contact block 904 contacts trolley cable 902 via a contact strip 908, which is fabricated from a high-conductivity, low-friction material (typically a carbon compound).

As the haul truck moves, there is mechanical wear at the interface between trolley cable 902 and contact strip 908. Mechanical wear is accelerated by heat generated by trolley cable 902 under high current loads. As the contact strip 908 wears, the contact resistance between trolley cable 902 and contact strip 908 increases, leading to further heating. Additionally, the trolley cable 902 wears. As the diameter of trolley cable 902 decreases, its resistance increases, again leading to further heating. By reducing the peak current drawn through trolley cable 902, the service life of both the contact strip 908 and the trolley cable 902 may be increased.

In an embodiment of the invention, ultracapacitor energy management controller 612 (see FIG. 6) monitors operational characteristics of the trolley power system via motor drive system data 628. Operational characteristics include DC link voltage and the current flowing through a trolley cable. When the current exceeds a user-defined upper current limit, power is supplied to the DC link capacitor 606 from the ultracapacitor bank 624. For a given energy storage capacity in ultracapacitor bank 624, the upper current limit may be set to supply peak current for the longest duration.

Embodiments have been described with reference to a mining haul truck. One skilled in the art may develop embodiments for other vehicles driven by electrical motors.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for supplying electrical power to an electrical motor on a vehicle, wherein the electrical motor operates in at least one propel interval and in at least one retard interval, the method comprising the steps of:
   charging an on-board electrical energy storage system with electrical power from the electrical motor during the at least one retard interval;
   supplying electrical power to the electrical motor during the at least one propel interval with electrical power from a trolley power system;
   monitoring the electrical power supplied from the trolley power system to the electrical motor;
   determining whether the electrical power supplied from the trolley power system is greater than a user-defined power limit; and
   supplying electrical power to the electrical motor from the on-board electrical energy storage system when the electrical power supplied from the trolley power system is greater than the user-defined power limit.

2. The method of claim 1, wherein:
   the on-board electrical energy storage system comprises at least one ultracapacitor.

3. The method of claim 2, further comprising the steps of:
   monitoring the voltage across the at least one ultracapacitor;
   determining whether the voltage is greater than a voltage limit; and
   supplying electrical power from the on-board electrical energy storage system only when the voltage is greater than the voltage limit.

4. The method of claim 1, wherein:
   the on-board electrical energy storage system comprises at least one battery.

5. The method of claim 1, further comprising the step of:
   charging the on-board electrical energy storage system with electrical power supplied from an auxiliary power supply.

6. The method of claim 5, wherein:
   the auxiliary power supply comprises a generator driven by an engine.

7. The method of claim 5, wherein:
   the auxiliary power supply comprises the trolley power system.

8. An electrical power system for supplying electrical power to an electrical motor on a vehicle, wherein the electrical motor is configured to draw electrical power during at least one propel interval and to generate electrical power during at least one retard interval, the electrical power system comprising:
   an on-board electrical energy storage system configured to receive the electrical power generated by the electrical motor during the at least one retard interval; and
   an inverter configured to:
     receive electrical power from the on-board electrical energy storage system;
     receive electrical power from a trolley power system; and supply electrical power to the electrical motor; and
a controller configured to:
supply electrical power to the electrical motor from only the trolley power system when the electrical power drawn by the electrical motor during the at least one propel interval is less than or equal to a power limit; and
supply first electrical power to the electrical motor from the trolley power system and second electrical power to the electrical motor from the on-board electrical energy storage system when the electrical power drawn by the electrical motor is greater than the power limit.

9. The electrical power system of claim 8, wherein:
the on-board electrical energy storage system comprises at least one ultracapacitor.

10. The electrical power system of claim 9, wherein the controller is further configured to:
monitor the voltage across the at least one ultracapacitor;
determine whether the voltage is greater than a voltage limit; and
supply electrical power from the on-board electrical energy storage system only when the voltage is greater than the voltage limit.

11. The electrical power system of claim 8, wherein:
the on-board electrical energy storage system comprises at least one battery.

12. The electrical power system of claim 8, further comprising:
an engine; and
an electrical generator coupled to the engine, wherein the electrical generator is configured to supply electrical power to the on-board electrical energy storage system.

13. A method for increasing the service life of a trolley power system, the trolley power system comprising a trolley cable, a contact strip, and a feeder cable conducting electrical current from the trolley cable to an electrical motor on a vehicle, wherein the electrical motor operates in at least one propel interval and in at least one retard interval, the method comprising the steps of:
charging an on-board electrical energy storage system with electrical power from the electrical motor during the at least one retard interval;
monitoring a current flowing through the trolley cable;
determining whether the current is greater than a current limit;
supplying electrical power to the electrical motor only from the trolley cable when the current is less than or equal to the current limit; and
supplying first electrical power to the electrical motor from the trolley cable and second electrical power to the electrical motor from the on-board electrical energy storage system when the current is greater than the current limit.

14. The method of claim 13, wherein:
the on-board electrical energy storage system comprises at least one ultracapacitor.

15. The method of claim 13, wherein:
the on-board electrical energy storage system comprises at least one battery.

16. An apparatus for supplying electrical power to an electrical motor on a vehicle, wherein the electrical motor operates in at least one propel interval and in at least one retard interval, the apparatus comprising:
means for charging an on-board electrical energy storage system with electrical power from the electrical motor during the at least one retard interval;
means for supplying electrical power to the electrical motor during the at least one propel interval with electrical power from a trolley power system;
means for monitoring the electrical power supplied from the trolley power system to the electrical motor;
means for determining whether the electrical power supplied from the trolley power system is greater than a user-defined power limit; and
means for supplying electrical power to the electrical motor from the on-board electrical energy storage system when the electrical power supplied from the trolley power system is greater than the user-defined power limit.

17. The apparatus of claim 16, wherein:
the on-board electrical energy storage system comprises at least one ultracapacitor.

18. The apparatus of claim 17, further comprising:
means for monitoring the voltage across the at least one ultracapacitor;
means for determining whether the voltage is greater than a voltage limit; and
means for supplying electrical power from the on-board electrical energy storage system only when the voltage is greater than the voltage limit.

19. The apparatus of claim 16, wherein:
the on-board electrical energy storage system comprises at least one battery.

20. The apparatus of claim 16, further comprising:
means for charging the on-board electrical energy storage system with electrical power supplied from an auxiliary power supply.

21. The apparatus of claim 20, wherein:
the auxiliary power supply comprises a generator driven by an engine.

22. The apparatus of claim 20, wherein:
the auxiliary power supply comprises the trolley power system.

23. An apparatus for increasing the service life of a trolley power system, the trolley power system comprising a trolley cable, a contact strip, and a feeder cable conducting electrical current from the trolley cable to an electrical motor on a vehicle, wherein the electrical motor operates in at least one propel interval and in at least one retard interval, the apparatus comprising:
means for charging an on-board electrical energy storage system with electrical power from the electrical motor during the at least one retard interval;
means for monitoring a current flowing through the trolley cable;
means for determining whether the current is greater than a current limit;
means for supplying electrical power to the electrical motor only from the trolley cable when the current is less than or equal to the current limit; and
means for supplying first electrical power to the electrical motor from the trolley cable and second electrical power to the electrical motor from the on-board electrical energy storage system when the current is greater than the current limit.

24. The apparatus of claim 23, wherein:
the electrical energy storage system comprises at least one ultracapacitor.

25. The apparatus of claim 23, wherein:
the electrical energy storage system comprises at least one battery.

* * * * *